US009709202B2

(12) United States Patent
Spears

(10) Patent No.: US 9,709,202 B2
(45) Date of Patent: Jul. 18, 2017

(54) PIPE CONNECTOR FITTING WITH ELONGATE GASKET AND METAL THREADS

(71) Applicant: SPEARS MANUFACTURING CO., Sylmar, CA (US)

(72) Inventor: Wayne Spears, Agua Dulce, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 14/932,541

(22) Filed: Nov. 4, 2015

(65) Prior Publication Data

US 2016/0123507 A1  May 5, 2016

Related U.S. Application Data

(60) Provisional application No. 62/075,660, filed on Nov. 5, 2014.

(51) Int. Cl.
*F16L 15/02* (2006.01)
*F16L 47/16* (2006.01)
(Continued)

(52) U.S. Cl.
CPC .............. *F16L 47/16* (2013.01); *A62C 31/28* (2013.01); *A62C 35/68* (2013.01); *F16L 15/003* (2013.01); *F16L 15/02* (2013.01); *F16L 27/082* (2013.01)

(58) Field of Classification Search
CPC ......... F16L 47/16; F16L 15/02; F16L 15/003; F16L 15/008; F16L 27/082; A62C 31/28; A62C 35/68

(Continued)

(56) References Cited

U.S. PATENT DOCUMENTS 2,535,816 A * 12/1950 Sigmund ............... F16L 37/124
285/110
3,620,556 A * 11/1971 Paddington ............ F16J 15/025
277/614

(Continued)

FOREIGN PATENT DOCUMENTS

DE         9204534 U1 * 10/1992  ............. F16J 15/062

OTHER PUBLICATIONS

Flo Control Quality Products by NDS, products Catalog, Sep. 2014, 32 pages.

*Primary Examiner* — David E Sosnowski
*Assistant Examiner* — James A Linford
(74) *Attorney, Agent, or Firm* — Jeffrey G. Sheldon; Leech Tishman Fuscaldo & Lampl

(57) ABSTRACT

A pipe connector fitting comprising a body comprising a longitudinal axis, a throat, opposed side walls, an upstream end and a downstream end, a bore defined by the body, a plurality of internal metal threads disposed within the body, an elongate gasket comprising a non-round cross-section, and a gasket retention area defined by the body, sized and dimensioned to accept and retain the gasket when the gasket is non-compressed and fully compressed and the gasket is never allowed to escape the gasket retention area into the throat of the body, the gasket retention area comprising a flat gasket retention surface disposed perpendicular to the longitudinal axis of the body, the gasket disposed within the gasket retention area, wherein, when a threaded male fitting is threadedly disposed within the body, the threaded male fitting can be rotated 360 degrees while remaining continuously fluid tight for pressures in excess of 300 psig.

15 Claims, 3 Drawing Sheets

(51) Int. Cl.
*A62C 35/68* (2006.01)
*F16L 15/00* (2006.01)
*A62C 31/28* (2006.01)
*F16L 27/08* (2006.01)

(58) Field of Classification Search
USPC .......................................... 285/110, 111, 112
See application file for complete search history.

(56) References Cited

U.S. PATENT DOCUMENTS

| | | | | |
|---|---|---|---|---|
| 3,900,220 A * | 8/1975 | Buchser | ................... | F16L 47/16 285/148.23 |
| 3,971,566 A * | 7/1976 | Levinsohn | ........... | F16J 15/0887 277/606 |
| 4,397,485 A * | 8/1983 | Wood | ................... | F16L 17/025 285/111 |
| 4,905,766 A * | 3/1990 | Dietz | ...................... | F16L 47/24 169/37 |
| 5,109,929 A * | 5/1992 | Spears | .................... | F16L 47/24 169/16 |
| 5,409,066 A * | 4/1995 | McHugh | ................ | A62C 35/68 169/16 |
| 5,437,481 A * | 8/1995 | Spears | .................... | F16L 47/24 285/148.13 |
| 6,186,558 B1 * | 2/2001 | Komolrochanaporn | ................................ | F16L 55/00 285/148.19 |
| 8,474,472 B2 | 7/2013 | Spears | | |
| 2007/0056751 A1 * | 3/2007 | Spears | .................... | A62C 35/68 169/16 |
| 2008/0012327 A1 * | 1/2008 | Spears | .................... | F16L 15/08 285/355 |
| 2010/0259042 A1 * | 10/2010 | Spears | .................... | F16L 15/02 285/379 |

* cited by examiner

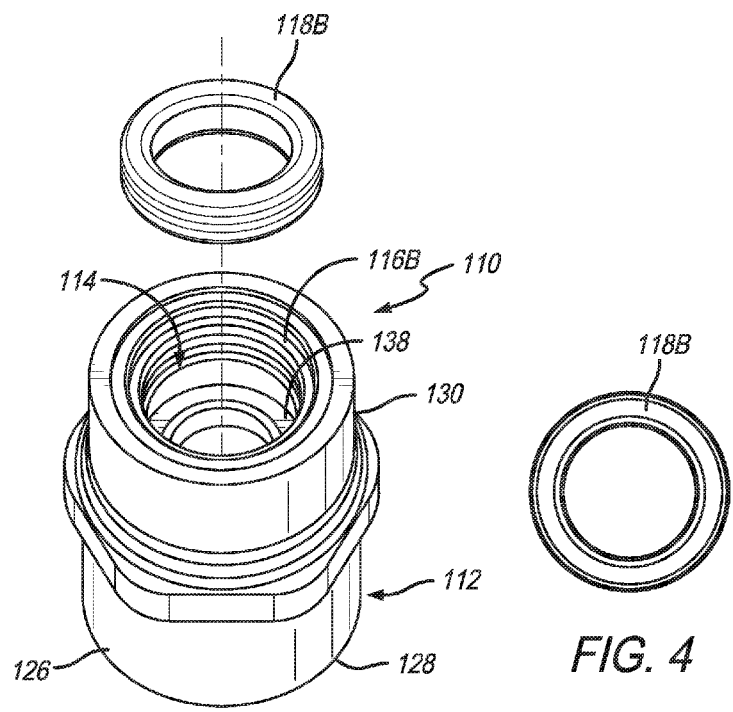
FIG. 3
FIG. 4
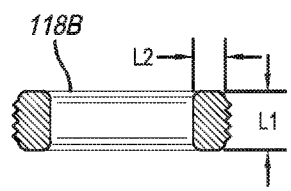
FIG. 5

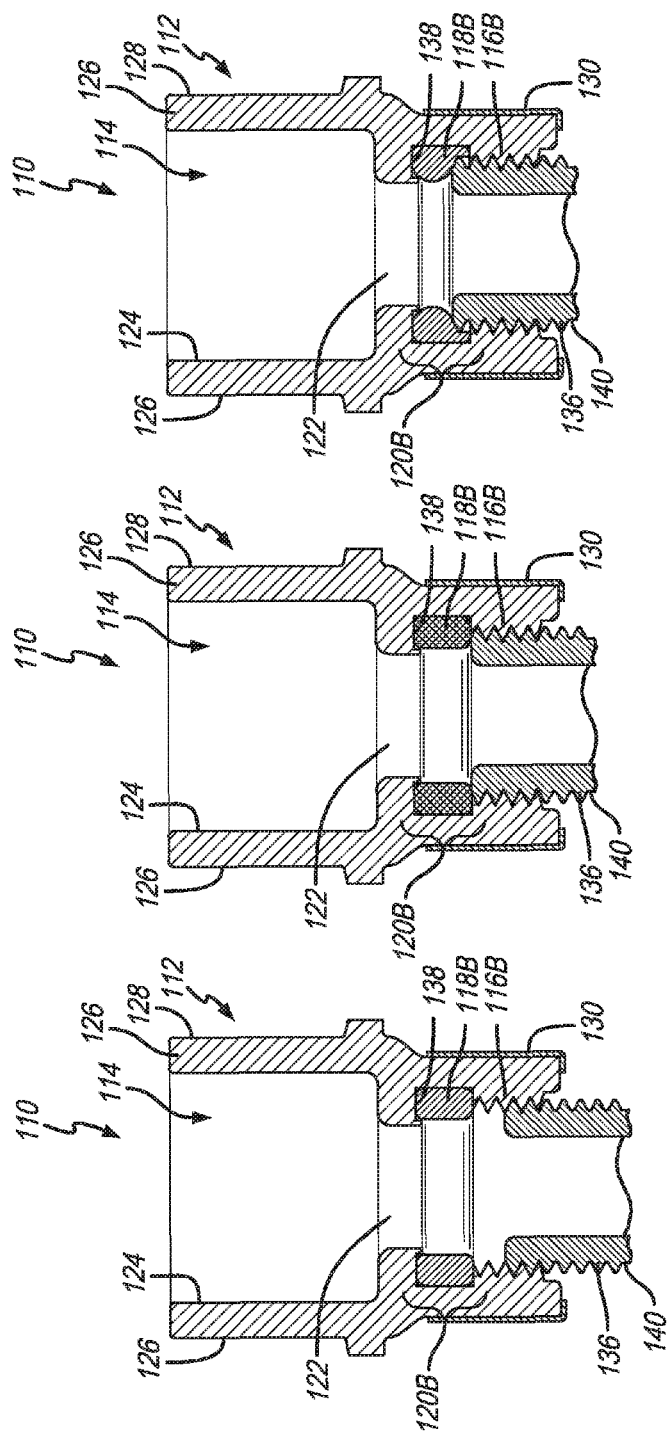

PIPE CONNECTOR FITTING WITH ELONGATE GASKET AND METAL THREADS

RELATED APPLICATIONS

This application claims priority from U.S. Patent Application Ser. No. 62/075,660 entitled "Pipe Connector Fitting with Elongate Gasket and Metal Threads," filed Nov. 5, 2014, the entirety of which is incorporated herein by reference.

BACKGROUND OF THE INVENTION

Fire sprinkler systems are increasingly recognized as necessary safety features in the construction of new buildings and in the upgrading of existing buildings. There is a problem, however, in the installation of fire sprinkler systems.

Many styles of fire sprinkler heads have built-in deflectors that require rotational orientation of the sprinkler head to correctly position the deflector to produce the desired spray pattern when the head operates. All prior art fire sprinkler heads are attached to the piping mains by tapered pipe threads designed to produce a water tight seal using the interference of the tapered threads, plus either or both of a thread tape or thread paste. Thus, it can be appreciated that proper orientation of prior art sprinkler heads can usually only be accomplished by under-tightening the sprinkler heads or over-tightening the sprinkler heads. Overtightening of the tapered pipe threads produces interference between the mating threads, resulting in distortion of the mating parts. Under-tightening over the tapered pipe threads can produce leaks.

U.S. Pat. No. 8,474,472 discloses a pipe fitting useable in the installation of a sprinkler head comprising (a) a body having an open upstream end and an open downstream end, the downstream end having internal threads capable of accepting a threaded male fitting, the body defining an gasket retention area located upstream of the internal threads; and (b) an elongated gasket disposed within the gasket retention area. In the invention, the gasket retention area and the gasket are chosen so that a threaded male fitting threadedly disposed within the downstream end of the body can be rotated within the downstream end of the body 360° while remaining liquid tight for pressures in excess of 300 psig. However, the internal threads of the disclosed pipe fitting are typically made from a thermal plastic, and, so, are vulnerable to assembly stresses and can be damaged on installation of mating part by misaligning threads "cross threading". Cross threading occurs when two threaded parts are assembled and the threads are not aligned with each other allowing one thread to cut into the other. Cross threaded assemblies are most common when at least one of the mating threads are soft (plastic) and are most common with two tapered threads where initial assembly has substantial thread clearance.

Accordingly, there is a need for a fire sprinkler fitting which avoids the aforementioned in the prior art.

SUMMARY OF THE INVENTION

According to one aspect of the present invention, there is provided a pipe connector fitting comprising a) a body comprising a longitudinal axis, a throat, opposed side walls, an upstream end and a downstream end; b) a bore defined by the body; c) a plurality of metal threads disposed within the body; d) an elongate gasket comprising a non-round cross-section; and e) a gasket retention area defined by the body and sized and dimensioned to accept and retain the elongate gasket both when the elongate gasket is non-compressed and fully compressed, such that the elongate gasket is never allowed to escape the gasket retention area into the throat of the body, the gasket retention area comprising a flat gasket retention surface disposed perpendicular to the longitudinal axis of the body, the elongate gasket being disposed within the gasket retention area; wherein, when a threaded male fitting is threadedly disposed within the body, the threaded male fitting can be rotated within the downstream end of the body 360° while remaining continuously fluid tight for pressures in excess of 300 psig.

According to another aspect of the present invention, there is provided a method of using a pipe connector fitting, wherein the method comprises the steps of: a) disposing the elongate gasket within the gasket retention area; b) disposing a fire sprinkler head comprising an upstream end within the downstream end of the body; c) threadedly disposing the fire sprinkler head into the downstream end of the body until the upstream end of the fire sprinkler head contacts the elongate gasket and sufficiently presses against the elongate gasket to effect a liquid tight seal with the gasket; and d) rotating the sprinkler head for up to 360° until it is in proper orientation.

DRAWINGS

Features, aspects and advantages of the present invention will become better understood with reference to the following description, appended claims, and accompanying drawings where:

FIG. 3 is an exploded perspective view of a second pipe connector fitting having features of the invention;

FIG. 4 is a plan view of a gasket useable in the invention;

FIG. 5 is a cross-sectional view of the gasket illustrated in FIG. 4;

FIG. 6 is a partial cross-section of a fire sprinkler within the fitting illustrated in FIG. 3 showing a fire sprinkler initially threaded into the fitting;

FIG. 7 is a partial cross-section of the combination illustrated in FIG. 6 showing the fire sprinkler fluid tight within the gasket within the fitting; and FIG. 8 is a partial cross-section of the fire sprinkler and fitting combination illustrated in FIG. 7 showing the fire sprinkler further rotated within the fitting, while remaining fluid tight against the gasket.

DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

In one aspect, the invention is a pipe connector fitting 110 comprising a body 112, a bore 114, a threaded annular metal insert 116A, 116B, an elongate gasket 118A, 118B, and a gasket retention area 120A, 120B.

Figure 1:
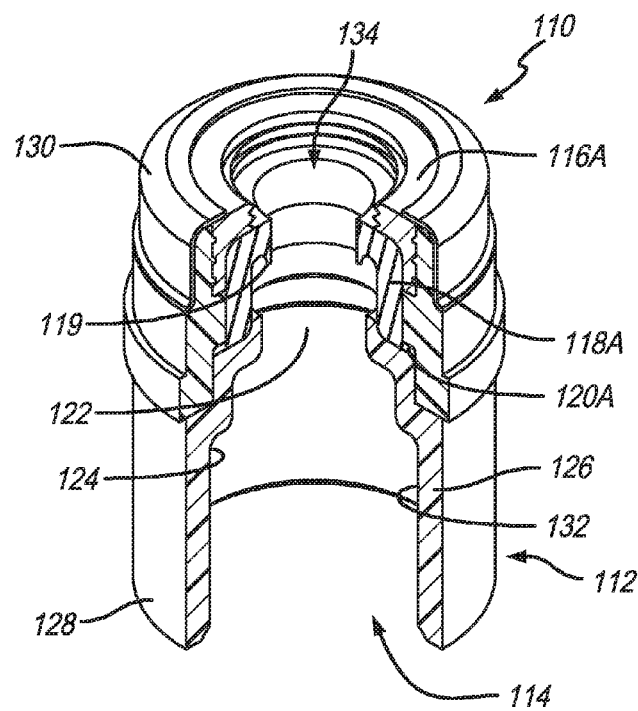
FIG. 1 is a partially cut away perspective view of a pipe connector fitting having features of the invention.
Figure 2:
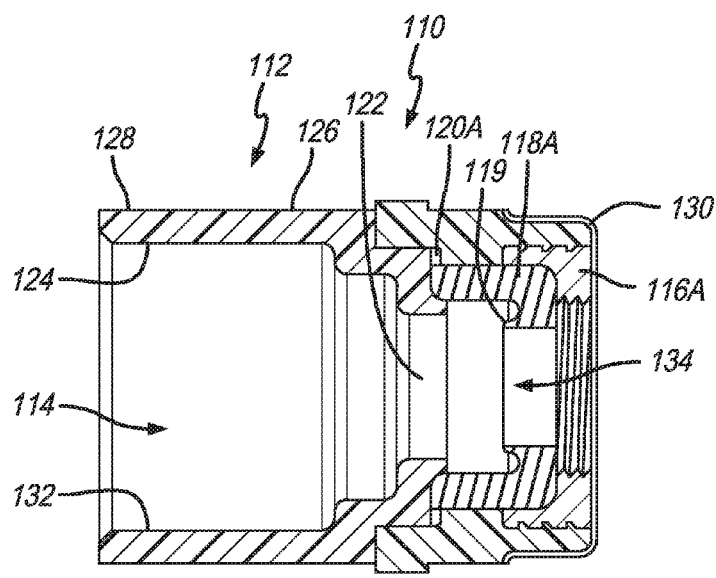
FIG. 2 is a cross-sectional view of the pipe connector fitting illustrated in FIG. 1.

The body 112 can be any size and dimension, and made from any material, but the body 112 is typically made from a thermoplastic, although in some applications it can be made from cast iron, steel, copper or brass. FIGS. 1-2 and 6-8 illustrate the body 112 in cross-section. The cross-section of the body 112 can be any shape, but preferably the cross-section of the body 112 is circular and the body 112 is cylindrical. The body 112 comprises a longitudinal axis, a throat 122, an internal surface 124, an inner wall 126, an upstream end 128, and a downstream end 130. As shown in FIGS. 1 and 2, the throat 122 is centered along the longitudinal axis between the upstream end 128 and the downstream end 130.

The bore 114 is defined by the inner wall 126 of the body 112 and comprises an internal surface 132 and a bore opening 134. The bore 114 can be any size and dimension, but preferably is sized and dimensioned to accept and rigidly retain an end of a pipe section (not shown) for which the pipe connector fitting 110 is to be used.

The threaded annular metal insert 116A, 116B is disposed along the internal surface 124 of the body 112. Preferably, the body 112 is made of thermoplastic and the threaded annular metal insert 116A, 116B is molded into the body 112. The metal threads of the threaded annular metal insert 116A, 116B are disposed either within the bore 114 or immediately outside of the bore 114. When disposed within the bore 114, the metal threads of the threaded annular metal insert 116A, 116B are typically molded into the inner wall 126 of the body 112. Other attachment means, however, can be used. When the metal threads of the threaded annular metal insert 116A, 116B are disposed immediately outside of the bore 114, the threaded annular metal insert 116A, 116B is attached to the body 112 by any suitable connection means. The threaded annular metal insert 116A, 116B can be attached to the body 112 by being molded to the body 112. The threaded annular metal insert 116A, 116B can be attached to the body 112 by adhesives, by welding or by mechanical connection means, such as clamps, clips, metal threads or press-fit. The threaded annular insert can comprise a step diameter, with a larger internal diameter portion longitudinally closer to the recessed gasket retention area than a smaller internal diameter portion.

Typically, such metal threads of the threaded annular metal insert 116A, 116B are a ½-14 NPT can conform to ASTM standard F1498, with the exception that the pitch diameter is at the end to oversize. Tolerance for fit with a threaded plug gauge is +/−1½ turns these metal threads of the threaded annular metal insert 116A, 116B are made to approximately 2 turns larger than the maximum size for a tapered pipe thread.

The elongate gasket 118A, 118B can be any size and dimension and made from any material, including but not limited to plastic, polyvinyl chloride, rubber, metal or an elastomeric material. Typically, the elongate gasket 118A, 118B is made from an elastomeric material. Many known elastomeric materials can be used in the elongate gasket 118A, 118B, such as EPDM, neoprene, silicone, buna-N, Hypalon, (Hypalon is a trademark for chlorosulfonated polyethylene (CSPE) synthetic rubber (CSM)) polyurethane, Santoprene, (Santoprene is a trademark for Thermoplastic Elastomer (TPE) Thermoplastic Vulcanate (TPV) vinyl and Viton (Viton is a trademark for FKM).

The body 112 defines a recessed gasket retention area 120A, 120B located upstream of the threaded annular metal insert 116A, 116B. The gasket retention area 120A, 120B is provided by a circumferential notch defined in the inner wall 126 of the body 112, and comprises a flat annular gasket retention surface 138 disposed perpendicular to the longitudinal axis of the body 112. The gasket retention area 120A, 120B is sized and dimensioned to accept and retain the elongate gasket 118A, 118B both when the elongate gasket 118A, 118B is un-compressed and when the elongate gasket 118A, 118B is fully compressed. The gasket retention area 120A, 120B is thus sized and dimensioned such that the elongate gasket 118A, 118B is prevented from moving from the gasket retention area 120A, 120B into the throat 122 of the body 112.

As best illustrated in FIGS. 4 and 5, the elongate gasket 118B has a non-round cross-section with a longitudinal axis and a transverse axis. The length L1 of the elongate gasket 118B in cross-section, measured along the longitudinal axis, is typically between about 0.25 inches and about 0.3 inches for an elongate gasket 118B having an internal diameter between about 0.5 inches and about 0.7 inches. The cross-section of the elongate gasket 118B also has a width L2, measured along the length of the traverse axis. Typically, L2 is between about 0.13 inches and about 0.15 inches for an elongate gasket 118B having an internal diameter between about 0.5 inches and about 0.7 inches.

In one typical embodiment, the elongate gasket 118A, 118B has an inside diameter of about 0.61 inches, a length L1 of about 0.27 inches and a width L2 of about 0.139 inches. It is typical in all embodiments that the ratio L2/L1 is typically between about 0.4 and about 0.6.

As illustrated in FIGS. 1 and 2, the elongate gasket 118A can comprise a hook-shaped cross-section 119 when un-compressed. The elongate gasket 118A extends longitudinally from the recessed gasket retention area through the larger internal diameter portion of the threaded annular metal insert 116A, and can abut the smaller internal diameter portion of the threaded annular metal insert 116A. The elongate gasket 118A can extend radially inwardly beyond the smaller internal diameter portion of the threaded annular metal insert 116A.

Both the elongate gasket 118A, 118B and the gasket retention area 120A, 120B are chosen so that a threaded male fitting 136 threadedly disposed within the downstream end 130 of the body 112 can be rotated within the downstream end 130 of the body 112 360° (one complete rotation) while remaining continuously fluid tight for pressures in excess for 300 psig, preferably in excess of 600 psig, more preferably in excess of 850 psig and most preferably in excess of 875 psig.

FIGS. 6-8 illustrate a second aspect of the invention, a method of employing the pipe connector fitting 110 to install a threaded male fitting 136 into pipe run. As illustrated in FIGS. 6-8, the threaded male fitting 136 can comprise a fire sprinkler head 140 and the pipe run can comprise water supply piping. The fire sprinkler head 140 comprises an upstream end suitable for disposition within the downstream end 130 of the body 112.

FIG. 6 illustrates the initial sequence of installing the pipe connector fitting 110 into the pipe run and threadedly disposing the fire sprinkler head 140 into the downstream end 130 of the body 112.

Next, as illustrated in FIG. 7, the fire sprinkler head 140 is threaded further into the body 112 until the upstream end of the fire sprinkler head 140 contacts the elongate gasket 118B and sufficiently presses against the elongate gasket 118B to effect a liquid tight seal with the elongate gasket 118B.

Lastly, as illustrated in FIG. 8, the fire sprinkler head 140 is rotated for up to 360° until it is in proper orientation. During this rotation, the fire sprinkler head 140 and the elongate gasket 118B maintain a liquid tight seal. As noted above, this liquid tight seal can preferably withstand in excess of 300 psig, more preferably in excess of 600 psig, still more preferably in excess of 850 psig and most preferably in excess of 875 psig.

The invention provides pipe fitting useable in the installation of a sprinkler head which can be rotated within the downstream end of the body 360° while remaining liquid tight for pressures in excess of 300 psig. Because the internal threads are metal—rather than thermoplastic, the internal threads are not vulnerable to assembly stresses. The metal threads carry all of the assembly stress, leaving the plastic and gasket to do the sealing.

Having thus described the invention, it should be apparent that numerous structural modifications and adaptations may be resorted to without departing from the scope and fair meaning of the instant invention as set forth herein above and described herein below by the claims.

What is claimed is:

1. A pipe connector fitting comprising:
   a) a cylindrical body disposed along a longitudinal axis, the body defining an inner wall, the body having a throat centered along the longitudinal axis between an upstream end and a downstream end thereof;
   b) a bore defined by the inner wall of the body;
   c) a threaded annular metal insert disposed within the body;
   d) an elongate gasket comprising a hook-shaped cross-section when un-compressed; and
   e) a recessed gasket retention area comprising (i) an annular gasket retention surface disposed in the body and aligned perpendicularly to the longitudinal axis of the body, and (ii) a lip extending longitudinally from the retention surface, the recessed gasket retention area and the lip being sized and dimensioned to accept and retain the elongate gasket to prevent the elongate gasket from moving from the recessed gasket retention area into the throat of the body;
   wherein, the elongate gasket is disposed within the recessed gasket retention area;
   wherein, when a threaded male fitting is threadedly disposed within the body, the threaded male fitting can be rotated within the downstream end of the body 360° while remaining continuously fluid tight for pressures in excess of 300 psig;
   wherein the threaded annular metal insert has a step diameter with a larger internal diameter portion longitudinally closer to the recessed gasket retention area than a smaller internal diameter portion;
   wherein the elongated gasket extends longitudinally from the recessed gasket retention area through the larger internal diameter portion and abuts the smaller internal diameter portion; and
   wherein the elongated gasket extends radially inwardly beyond the smaller internal diameter portion.

2. The pipe connector fitting of claim 1, wherein the body is made from a thermoplastic and the threaded annular metal insert is molded into the body.

3. The pipe connector fitting of claim 1, wherein the threaded annular metal insert is defined within the bore.

4. The pipe connector fitting of claim 1, wherein the threaded metal insert is molded into the side walls of the body.

5. The pipe connector fitting of claim 1, wherein the threaded annular metal insert is attached to the body by one or more of the following: adhesives, by welding or by mechanical connection means, such as clamps, clips, metal threads or press-fit.

6. The pipe connector fitting of claim 1, wherein the elongate gasket is made from an elastomeric material.

7. The pipe connector fitting of claim 1, wherein the ratio between a width and a length of the elongate gasket is between about 0.4 and 0.6.

8. The pipe connector fitting of claim 1, wherein the recessed gasket retention area comprises a circumferential notch defined in the inner wall of the body.

9. A pipe connector fitting comprising:
   a) a cylindrical body made from a thermoplastic, the body disposed along a longitudinal axis, the body defining an inner wall, the body having a throat centered along the longitudinal axis between an upstream end and a downstream end thereof;
   b) a bore defined by the inner wall of the body;
   c) a threaded annular metal insert defined within the bore and molded into the inner wall of the body;
   d) an elongate gasket comprising a hook-shaped cross-section when un-compressed; and
   e) a recessed gasket retention area comprising a circumferential notch defined in the inner wall of the body, the circumferential notch having (i) an annular gasket retention surface aligned perpendicularly to the longitudinal axis of the body, and (ii) a lip extending longitudinally from the retention surface, the recessed gasket retention area and the lip being sized and dimensioned to accept and retain the elongate gasket to prevent the elongate gasket from moving from the recessed gasket retention area into the throat of the body;
   wherein, the elongate gasket is disposed within the recessed gasket retention area;
   wherein, when a threaded male fitting is threadedly disposed within the body, the threaded male fitting can be rotated within the downstream end of the body 360° while remaining continuously fluid tight for pressures in excess of 300 psig;
   wherein the threaded annular metal insert has a step diameter with a larger internal diameter portion longitudinally closer to the recessed gasket retention area than a smaller internal diameter portion;
   wherein the elongated gasket extends longitudinally from the recessed gasket retention area through the larger internal diameter portion and abuts the smaller internal diameter portion; and
   wherein the elongated gasket extends radially inwardly beyond the smaller internal diameter portion.

10. The pipe connector fitting of claim 9, wherein the ratio between a width and a length of the elongate gasket is between about 0.4 and 0.6.

11. A method for installing a sprinkler head into a water supply pipe run, the method comprising the steps of:

a) providing the pipe connector fitting of claim 1;
b) installing the pipe connector fitting into the water supply pipe run;
c) disposing the elongate gasket within the recessed gasket retention area;
d) disposing a fire sprinkler head comprising an upstream end within the downstream end of the body;
e) threadedly disposing the fire sprinkler head into the downstream end of the body until the upstream end of the fire sprinkler head contacts the elongate gasket and sufficiently presses against the elongate gasket to effect a liquid tight seal with the gasket; and
f) rotating the sprinkler head for up to 360° until it is in proper orientation.

12. The method of claim 11, wherein the pipe connector body is made from a thermoplastic and the metal threads are molded into the body.

13. The method of claim 11, wherein the plurality of metal threads are inside the bore.

14. The method of claim 11, wherein the non-round cross section of the elongate gasket comprises a longitudinal axis and a transverse axis and the length of the elongate gasket is taken along the longitudinal axis and the width of the elongate gasket is taken along the transverse axis, and wherein the elongate gasket comprises an internal diameter between about 0.5 inches and about 0.7 inches, and the length of the elongate gasket is between about 0.25 inches and about 0.3 inches and the width of the elongate gasket is between about 0.13 inches and about 0.15 inches.

15. The method of claim 14, wherein the ratio between the width and the length of the elongate gasket is between about 0.4 and 0.6.

* * * * *